United States Patent [19]

Elizondo et al.

[11] Patent Number: 4,663,040

[45] Date of Patent: May 5, 1987

[54] ROTARY DRUM FILTER GRID EXTENSION AND METHOD

[76] Inventors: H. J. Elizondo, 123 Coleman Rd.; Robert V. Hunziker, 300 Warren Dr., Apt. 1202; Phillip N. Nelson, 132 Roundtree Dr., all of West Monroe, La. 71291; Michael T. Risinger, Rte. 3, Box 118X, Marion, La. 71260

[21] Appl. No.: 801,070

[22] Filed: Nov. 22, 1985

[51] Int. Cl.⁴ .............................................. B01D 33/06
[52] U.S. Cl. ................................. 210/402; 29/400 M; 29/428; 210/541; 210/542
[58] Field of Search ............... 210/402, 403, 404, 161, 210/174, 210-217, 326, 541, 542, 394, 232; 29/400 R, 400 M, 428; 162/323, 357, 372; 209/288

[56] References Cited

U.S. PATENT DOCUMENTS 4,419,165 12/1983 La Valley ........................... 162/372

Primary Examiner—Frank Sever
Attorney, Agent, or Firm—John M. Harrison

[57] ABSTRACT

This invention relates to a method and apparatus for constructing and refurbishing rotary drum filters having longitudinal compartments, or grids, along the deck periphery. The method includes installing novel single-leg grid extensions, angle grid extensions or T-shaped anti-rewetting grid extensions by means of pins seated in slots cut in the deck grids to a uniform depth with respect to the theoretical centerline of the filter drum. This procedure eliminates the requirement for conventional machining of the grid outer edges to a fixed radius with respect to the theoretical drum centerline. The apparatus includes spaced slots cut to a predetermined depth in the extending surfaces of the grids and pins extending through the elongated grid extensions for seating in the slots and precisely locating the grid extensions on the grids at a common radius extending from the theoretical centerline of the drum.

33 Claims, 16 Drawing Figures

ROTARY DRUM FILTER GRID EXTENSION AND METHOD

BACKGROUND OF THE INVENTION

1. Field of the Invention

Rotary drum filters are used in the pulp and paper industry for filtering liquid out of pulp. Such devices are cylindrical in shape and are typically constructed of metallic and fiberglass materials. The outer drum surface acts as a filtering medium or structure, through which the liquid passes while the pulp remains on the surface of the structure as the drum rotates, partially submerged in a tank containing a paper pulp stock. In the manufacture of rotary drum filters, a large cylinder is structurally supported on the inside by flyrings and is closed on the ends by end supports and the outside surface of the cylinder is rarely true to the centerline of the drum. Longitudinal ribs or grids are installed on the outside surface, or deck of the cylinder in spaced relationship and extend along the length of the cylinder deck. Since the outer edges of the grids are not true to the centerline of the drum, the grids must be machined true to this centerline, a procedure which is very time consuming and costly. In the case of open-channel decks, after this machining is completed, backing wire grooves are spirally machined into the outer edges of the grids and backing wire is wrapped in the grooves to provide a base which supports a filter screen. In the case of corrugated anti-rewetting decks, a corrugated filter plate is installed after the grids are machined true to the drum centerline.

The grid extension technique and apparatus of this invention applies equally well to the rebuilding of open-channel rotary drums with deteriorated backing wire grooves, and construction of new drums. The present state of the art in constructing a grid system of uniform radius with respect to the centerline of the drum requires one of two basic procedures; either machine new backing wire grooves to the desired uniformity in the grids or weld a grid extension to each grid and machine new grooves in the the grid extensions to a true tolerance. Both solutions require valuable machine time and are expensive. The pin and groove method of installing grid extensions according to this invention minimizes the cost of reconstructing filter drums. This invention is applicable to open-channel decks and also includes anti-rewetting grid extension configurations which can be installed by the same pin and groove method. The procedure of this invention regarding existing drums which are ready to be refurbished is to remove the existing backing wire; machine spaced, circumferential slots in the existing grids; install single-leg, inside and outside grid extensions or anti-rewetting grid extensions provided with pin locators; and reinstall the drum backing wire. The anti-rewetting grid extension construction is useful in many applications to improve washing efficiency due to reduced air entrapment and reduction of rewetting in the filter cake at higher pulp production rates.

2. Description of the Prior Art

Rotary drum filters of the same general design as that disclosed in U.S. Pat. No. 3,150,082, dated Sept. 22, 1964, to John P. Rich, have long been known in the art. This patent details a rotary drum filter which includes a tank adapted to contain a mixture to be filtered, a cylindrical drum mounted for rotation in the tank and partially submerged in the mixture, and an improved valve means which is designed to reduce to negligible proportions any contained volume of liquid, particularly that volume adjacent the filter surface, where liquid might be held and contamination realized. U.S. Pat. No. 3,150,083, dated Sept. 22, 1964, to Oscar L. Nashua, entitled "Filters", discloses a rotary drum filter of the valveless vacuum type, wherein each backward-oriented passageway which drains a drum sector extends for the entire length of the filter drum, such that the filtrate may pass directly into and through the filtrate passageway without the necessity of movement in an axial direction along the length of the drum. The patent details a rotary drum filter which provides a maximum number of drum sectors, each with an independent passageway which provides an efficient shape, construction and arrangement of passageways from a mechanical and hydraulic efficiency standpoint. A "Center Valve Filter" is disclosed in U.S. Pat. No. 3,327,863, dated June 27, 1967, to Ralph W. Turner, Jr. The "Center Valve Filter" is designed to facilitate the venting of filtrate compartments in a novel manner directly from a valve structure located directly at the end of the filtrate compartment. This feature is said to provide a greatly improved efficiency of filtrate removal. U.S. Pat. No. 3,403,786, dated Oct. 1, 1968, to Oscar L. Nashua, entitled "Rotary Drum Filter" includes an improved rotary drum filter which is constructed for filtering a slurry such as the paper pulp stock employed in the manufacture of paper. The filter includes inner and outer drum members extending in concentric relationship, to provide a space between the drum members. A rolling means is disposed within the space between the drum members for supporting the outer drum member upon the inner drum member and dividing the space into a plurality of compartments. One of the drum members is constructed to collect filtered stock during rotation and an operating means is provided for rotating this drum member. The "Rotary Drum Filter" disclosed in U.S. Pat. No. 3,363,774, dated Jan. 16, 1968, to Oscar L. Nashua, discloses a drum filter having an axial end valve and containing compartments located on the circumference, which compartments are enclosed by cover plates. The cover plates are arranged to provide an inlet slot opening into each compartment located adjacent the trailing end of that compartment. Each conduit leading from a compartment to the axial end valve is positioned in a circumferential direction, such that a major portion of the volume contained in the conduit and the corresponding compartment rotates ahead of an angular plate extending through the compartment slot. Liquid contained in the conduit and in the subject compartment is substantially prevented by the cover plate from draining by gravity out of the slot throughout a substantial portion of the rotary downward travel of the filtrate compartment, from a position of maximum height in the rotary path of the filter drum. U.S. Pat. No. 3,530,992, dated Sept. 29, 1970, to Ralph W. Turner, Jr. and entitled "Rotary Drum Filter" is directed to a rotary drum filter which includes a rotatable drum having generally longitudinally extending filtrate compartments along the deck periphery. The filtrate compartments include juxtaposed open ends and the filter is caused to rotate through a first filter cycle during which sub-atmospheric pressure is momentarily applied through the open ends to the compartments for filter cake accretion, and a second cycle, during which the sub-atmospheric pressure is cut off from the compartments. The application of the sub-atmospheric pressure is controlled by a stationary valving assembly which includes plate elements resiliently biased into sliding engagement with the drum at the open ends of the filtrate compartments. U.S. Pat. No. 4,066,555, dated Jan. 3, 1978, to Joseph A. Pascale, entitled "Rotary Filter", includes an improved rotary filter which is cylindrical in shape and operates by vacuum suction to withdraw fluids from a substance exposed to the outer area of the device. The operation calls for drawing the fluids into the filter and pumping them to a suitable reservoir, and the system includes an inner cylindrical surface with a plurality of selectively spaced support structures extending longitudinally along the inner cylinder. The support structures are covered with a plastic covering which is adapted to receive a filtering medium forming the outer circumference of the rotary filter and in one embodiment, the plastic is grooved to receive a spirally-wound wire to further support the filtering medium. A "Method of Making a Rotary Drum Filter and Method of Making an Annular Valve Housing for Such a Drum Filter" is detailed in U.S. Pat. No. 4,419,165, dated Dec. 6, 1983, to Richard W. LaValley. The filter device which is detailed in this patent includes a plastic rotary drum filter which is constructed by applying a layer of plastic to the interior surface of a cylindrical mold, removing the mold, and applying at least one additional layer of plastic to the exposed exterior surface of the shell formed by the first layer. A plastic annular axial valve housing with plural valve chambers and a central valve-receiving space is mounted to a head assembly at the end of the shell. A tail assembly closes the opposite end of the shell to form the drum. Circumferentiallyspaced interior plastic bucket sections are positioned midway between the head and tail assemblies. Upon periodic application of a vacuum to the valve chambers, filtrate is delivered from the enterior of the drum through an associated bucket and plastic drainage conduit to a cooperating valve chamber. Plastic reinforcing rings strengthen the drum along the length thereof and in the region of the bucket section.

An object of this invention is to provide new and improved grid extensions for installation on the grids of conventional vacuum filters, which grid extensions are each so mounted as to be automatically situated at a true radius with respect to the theoretical centerline of the filter drum.

A still further object of this invention is to provide new and improved grid extensions which are each characterized by a single-leg grid extension provided with spaced pins for seating in grooves or slots provided in conventional single-leg or channel grids located on the filter drum deck, to automatically align and seat the pins in the grooves or slots and orient the grid extensions and back wire mounted on the grid extensions, to a common radius with respect to the theoretical centerline of the filter drum.

Yet another object of the invention is to provide new and improved anti-rewetting grid extensions for mounting on the grids of a vacuum filter, which anti-rewetting grid extensions are characterized by L and T-shaped grid extension plates provided with spaced pins for seating in grooves or slots provided in the grids to locate the anti-rewetting grid extensions at a common drum radius with respect to the theoretical centerline of the drum.

It is another object of this invention to provide a new and improved technique for repairing the grids of rotary drum vacuum filters without the necessity of machining the grids to a true radius with respect to the theoretical drum centerline.

Still another object of this invention is to provide a new and improved method for installing grid extensions on the existing grids of vacuum drum filters, which method includes the steps of providing spaced grooves or slots in the existing drum grids, such that the base of each of these grooves or slots corresponds to a common radius which is measured from the theoretical longitudinal centerline of the filter drum; inserting pins through multiple grid extensions at points on the grid extensions which correspond to the grooves or slots in the grids; and welding the pins in the grooves or slots to locate the grid extensions longitudinally along the existing grids at a second, larger common radius with respect to the theoretical longitudinal centerline of the filter drum.

SUMMARY OF THE INVENTION

These and other objects of the invention are provided in a method and apparatus for installing grid extensions on rotary drum vacuum filters, which invention applies to the manufacturing of new filter drums, as well as the rebuilding of existing drums. In both cases, the grid extension pin and groove method and apparatus of this invention minimizes costly machining of grids in order to achieve a round drum surface having a true radius measured from the theoretical drum centerline. In the case of new drums, multiple conventional longitudinal single-leg or channel grids are installed at a radius which is less than the desired drum radius and circumferential slots are cut in spaced relationship in these existing grids to an accurate, uniform drum radius with respect to the theoretical centerline of the filter drum. Grid extensions of selected configuration and design are then provided with locator or "stop" pins installed at a fixed distances from the outer or top edges of the grid extensions and the pin spacing over the length of the grid extensions matches the spacing of the circumferential slots in the original grid. The grid extensions are then installed on the grids with the locator pins fitting iinto the circumferential slots and welded therein. The pins align the top edges of the grid extensions at a second fixed radius relative to the theoretical centerline of the filter drum.

BRIEF DESCRIPTION OF THE DRAWINGS

The invention will be better understood by reference to the accompanying drawings, wherein.

DESCRIPTION OF THE PREFERRED EMBODIMENTS

Figure 1:
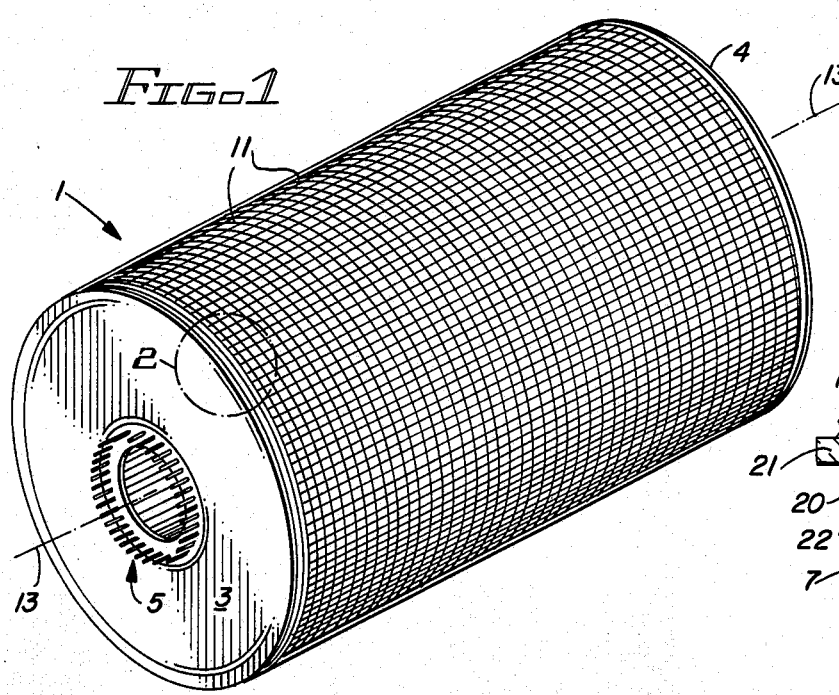
FIG. 1 is a perspective view of a conventional filter drum having an open-deck design.
Figure 3:
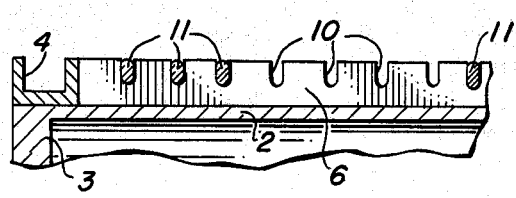
FIG. 3 is a sectional view, taken along line 3—3 in FIG. 2, of a typical single-leg grid secured to the filter drum deck.
Figure 2:
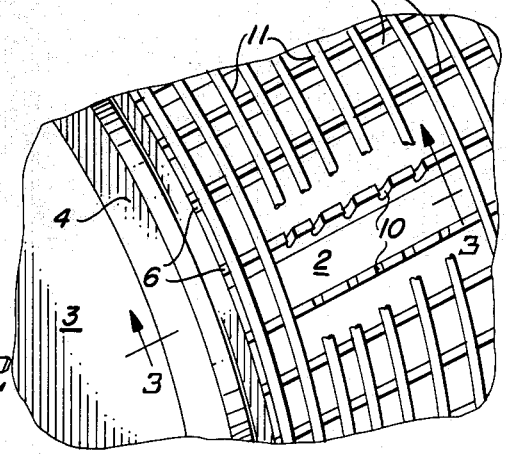
FIG. 2 is an enlarged section of an end portion of the filter drum illustrated in FIG. 1.
Figure 4:
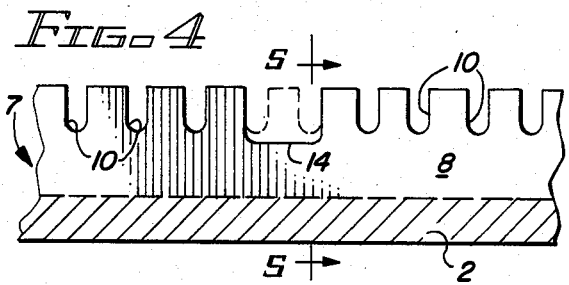
FIG. 4 is an enlarged elevation, partially in section, of a conventional channel grid section, more particularly illustrating a typical pin slot detail according to this invention.
Figure 5:
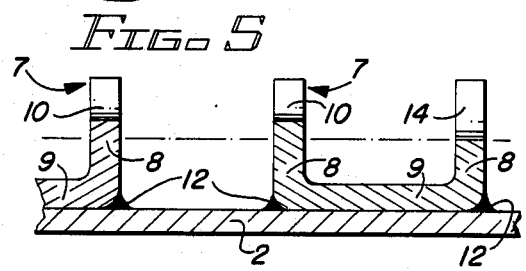
FIG. 5 is a sectional view, taken along line 5—5 of the channel grid section illustrated in FIG. 4.

Referring to FIGS. 1-3 of the drawings, a conventional filter drum is generally illustrated by reference numeral 1 and includes a generally cylindrically-shaped deck 2, closed by a pair of end plates 3. A plate flange 4 joins the end plates 3 to the deck 2 and multiple single-leg grids 6 are welded or otherwise mounted longitudinally on the deck 2 in spaced relationship, as illustrated in FIG. 2. The filter drum 1 is designed to be rotated by a trunnion (not illustrated) which is secured to the end plates 3 of the filter drum 1 at the trunnion mount 5, illustrated in FIG. 1. As illustrated in FIGS. 2 and 3, each of the multiple, single-leg grids 6 are provided with spaced grooves 10 along the entire length thereof. The grooves 10 are designed to receive backing wire 11, which is wrapped around the filter drum 1 in order to support a wire mesh (not illustrated) which serves as the filtering surface for the filter drum 1.

Figure 6:
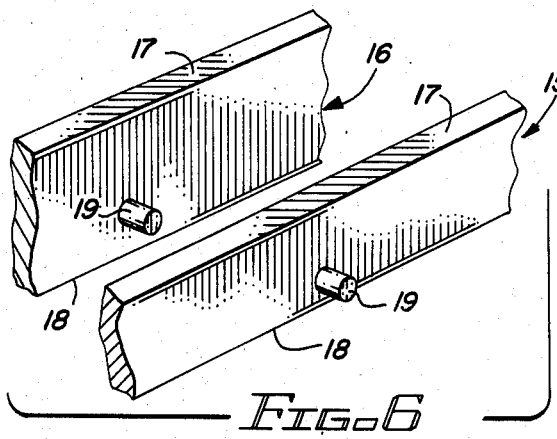
FIG. 6 is a perspective view, partially in section, of a pair of grid extensions fitted with locator pins according to the invention.
Figure 7:
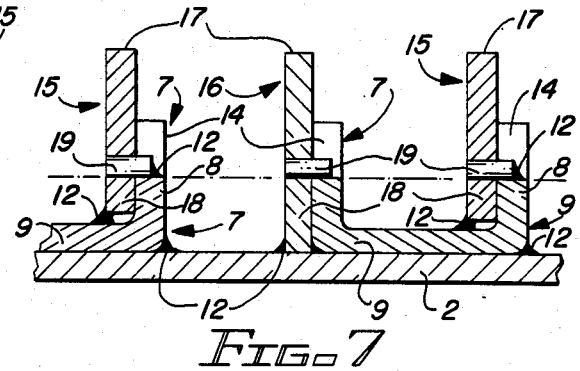
FIG. 7 is a sectional view of the channel grid section illustrated in FIG. 5, with the grid extensions in place and the pins seated in the pin slots provided in the underlying grids.

Referring now to FIGS. 1 and 4-7 of the drawings channel grids 7 are secured by means of the welds 12 to the deck 2 of the filter drum 1 in spaced relationship, instead of the single-leg grids 6 illustrated in FIGS. 1-3. According to this invention, pin slots 14, along with the conventional grooves 10, are provided in spaced relationship in the channel grid legs 8 which project upwardly from the channel grid base 9, lying adjacent the deck 2. The pin slots 14 are somewhat wider and deeper and are fewer in number than the adjacent grooves 10 and the pin slots 14 are designed to be cut to a uniform depth in each of the channel grid legs 8, in order to conform to a uniform radius with respect to the theoretical center line 13, noted in FIG. 1, of the filter drum 1. The pin slots 14 are cut through existing grooves 10 in the case of refurbished filter drums; alternatively, the pin slots 14 are provided as new slots in the channel grid legs 8 of the channel grids 7 in newly constructed filter drums 1. As illustrated in FIG. 6 of the drawings, multiple inside grid extensions 15 and slightly wider outside grid extensions 16 are provided with multiple pins 19 located in spaced relationship an equal distance from the top edge 17 of each of the inside grid extensions 15 and the outside grid extensions 16. It is important to note that the pins 19 are equidistant from the top edges 17 in both the inside grid extensions 15 and the outside grid extensions 16, despite the disparity in width between the grid extensions, for reasons which will be hereinafter described. The inside grid extensions 15 and outside grid extensions 16 are equal in length to the channel grids 7 and are designed to align with the channel grid legs 8 of the channel grids 7, with the pins 19 located in the pin slots 14, as illustrated in FIG. 7 of the drawings. Since the inside grid extensions 15 must be mounted between the channel grid legs 8 and are seated on the channel grid base 9 of each of the channel grids 7, the inside grid extensions 15 are each shorter by the width of the channel grid bases 9 than the outside grid extensions 16, the later of which are mounted outside of each of the channel grids 7 and are seated on the deck 2. Welds 12 serve to secure bottom edges 18 of the inside grid extensions 15 to the channel grid bases 9 and the bottom edges 18 of the outside grid extensions 16 to the deck 2, in alternating relationship. Additional welds 12 can be used to secure the ends of the pins 19 to the pin slots 14, respectively, as desired. In this regard, and in a most preferred embodiment of the invention, the pins 19 are shorter than the width of the pin slots 14 to provide room for the welds 12, a factor which aids in anchoring the inside grid extensions 15 and outside grid extensions 16 to the channel grids 7.

Figure 8:
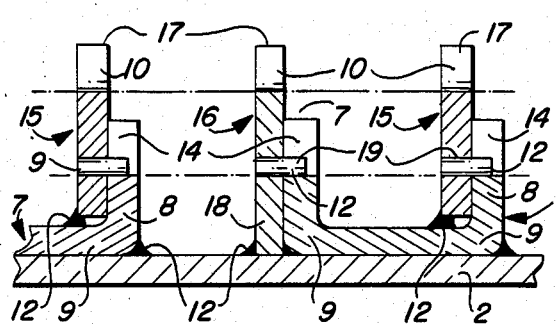
FIG. 8 is a sectional view of the channel grid section illustrated in FIGS. 4-7, illustrating new backing wire grooves cut in the top edges of the newly installed grid extensions.

Referring now to FIGS. 8-12 of the drawings, when the inside grid extensions 15 and outside grid extensions 16 have been secured to the channel grids 7 by means of the welds 12, additional grooves 10 are provided in the top edges 17 of the inside grid extensions 15 and the outside grid extensions 16 as illustrated in FIG. 8. Backing wire 11 is then seated in the new grooves 10 formed in the top edges 17, in the same manner as the backing wire 11 illustrated in FIGS. 1-3. The respective strands of backing wire 11 are now located at a common working and filtering radius with respect to the theoretical centerline 13 of the filter drum 1, since the pins 19 are seated in pin slots 14 which correspond to a common radius with respect to the theoretical centerline 13. Application of wire screen on the backing wire 11 is then accomplished in conventional manner, to insure that pulp is removed in a uniform layer or coat from the filter drum 1, according to the knowledge of those skilled in the art.

Figure 16:
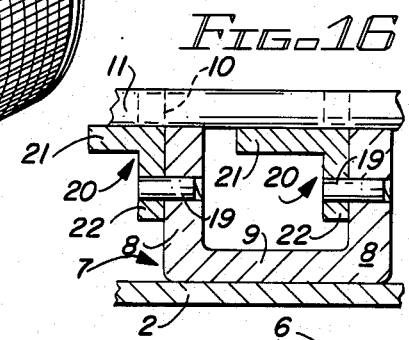
FIG. 16 is a sectional view of a pair of anti-rewetting grid extensions mounted on a channel grid with the backing wire in functional position.
Figure 13:
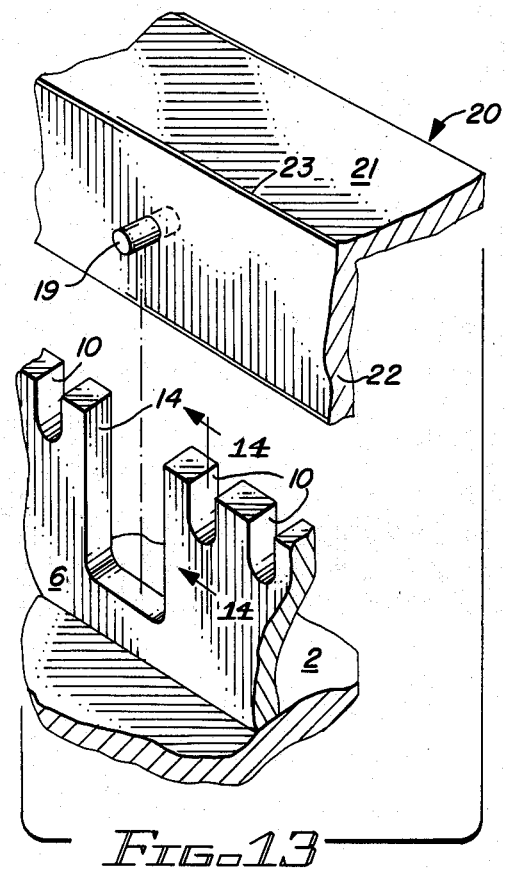
FIG. 13 is a perspective, sectional view of an anti-rewetting grid extension embodiment of the invention.
Figure 14:
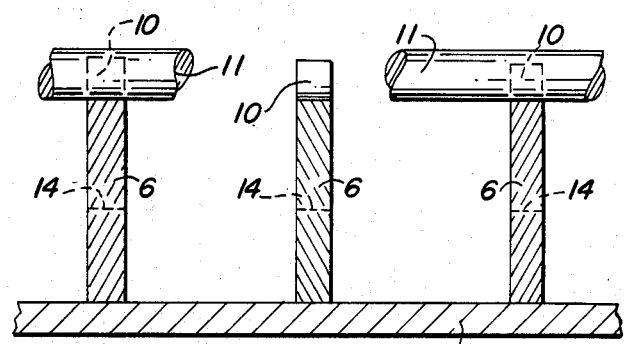
FIG. 14 is a sectional view, taken along line 14—14 in FIG. 13, of a single-leg grid and backing wire orientation in the anti-rewetting grid extensions.
Figure 15:
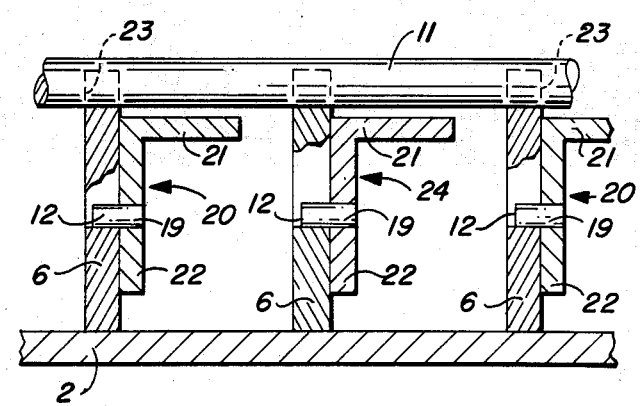
FIG. 15 is a sectional view of a pair of anti-rewetting grid extensions located on each side of an angle grid extension, all of which are mounted on single-leg grids with the backing wire in position.

Referring now to FIGS. 13-15 of the drawings in another preferred embodiment of the invention, anti-rewetting grid extensions 20 and a single angle grid extension 24 (see FIG. 15) are positioned on single-leg grids 6 which are, in turn, welded or otherwise secured to the deck 2 of the filter drum 1 in the same manner as the single-leg grids 6 illustrated in FIG. 1. Furthermore, referring to FIG. 16, the anti-rewetting grid extensions 20 are also illustrated in a preferred installation on a channel grid 7. As in the case of the inside grid extensions 15 and outside grid extensions 16, the anti-rewetting grid extensions 20 and angle grid extension 24 are provided with pins 19 located in spaced relationship along the bottom leg 22 thereof, equally spaced from the extending leg 21 and the opposite end of the bottom leg 22. The extending leg 21 of each of the anti-rewetting grid extensions 20 and the angle grid extension 24 extends in perpendicular relationship from the bottom leg 22 and is designed to act as an anti-rewetting structure when the filter drum 1 is rotated. In the anti-rewetting grid extensions 20, the support leg 23 extends the bottom leg 22 at the point of attachment of the extending leg 21 and serves to support the backing wire 10, as hereinafter described. As illustrated in FIG. 15, when the grooves 10 in the projecting ends of the single leg grids 6 are located at the proper radius and are in good repair, the angle grid extension 24 can be used with each of the single leg grids 6 to supply an anti-rewetting feature to the filter drum 1. Although not illustrated, it will be appreciated that an angle grid extension 24 can also be used with each channel grid leg 8 in the channel grids 7 under circumstances where the grooves 10 in the channel grid legs 8 are in good repair and are located at the desired common radius of the filter drum 1. However, when the grooves 10 are in poor repair or are not located at the proper common radius, the anti-rewetting grid extensions 20 are used instead, in order to provide the support legs 23, which feature the new grooves 10. In the case of both the anti-rewetting grid extensions 20 and the angle grid extensions 24, the pins 19 are seated in the pin slots 14 in the same manner as described above with respect to the inside grid extensions 15 and the outside grid extensions 16, and are secured in place by means of welds 12 located at the ends of the pins 19. Since the support legs 23 of the anti-rewetting grid extensions 20 and the angle grid extensions 24 partially block the distance between the single-leg grids 6 and the channel grid legs 8, respectively, use of the welds 12 at the ends of the pins 19 to secure the pins 19 in the pin slots 14 of the single-leg grids 6 and the channel grid legs 8 is the only practical means for securing the respective anti-rewetting grid extensions 20 and the angle grid extensions 24 to the single-leg grids 6 and the channel grid legs 8, respectively. When the anti-rewetting grid extensions 20 and the angle grid extensions 24 are secured in position as illustrated in FIGS. 13, 15 and 16, the backing wire 11 is extended through the existing conventional grooves 10 provided in the top edges of the single-leg grids 6 where the angle grid extensions 24 are used, and through new grooves 10 located in the support legs 23 of the anti-rewetting grid extensions 20, as illustrated in FIGS. 14, 15 and 16, where the anti-rewetting grid extensions 20 are needed. In applications where some of the existing grooves 10 located in either the single-leg grids 6 or the channel grid legs 8 are located at the appropriate common drum radius and are in good repair and others are not, the angle grid extensions 24 can be utilized where the grooves 10 are so located and are sound and the anti-rewetting grid extensions 20 used where the grooves 10 are in poor repair or are improperly located with respect to the drum centerline.

Figure 9:
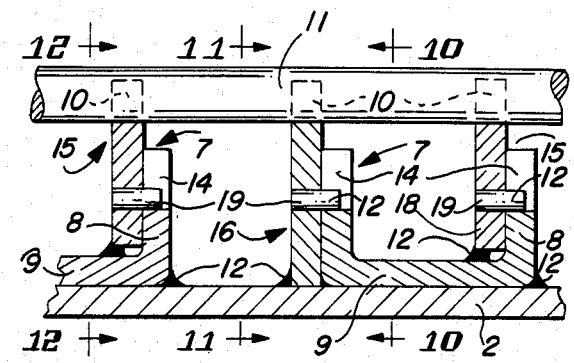
FIG. 9 is a sectional view of the channel grid section illustrated in FIGS. 4-8, with the backing wire installed on the new grid extensions.
Figure 10:
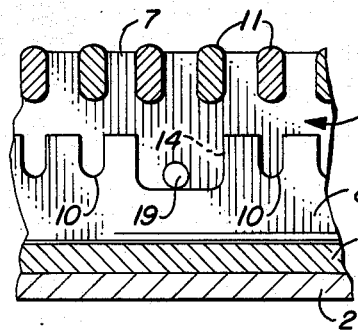
FIG. 10 is a sectional view, taken along line 10—10 in FIG. 9, of the channel grid extensions illustrated in FIG. 9.
Figure 11:
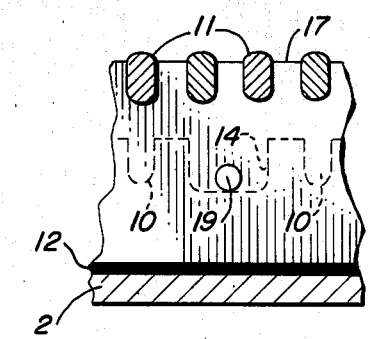
FIG. 11 is a sectional view, taken along line 11—11 in FIG. 9, of the channel grid extensions illustrated in FIG. 9.
Figure 12:
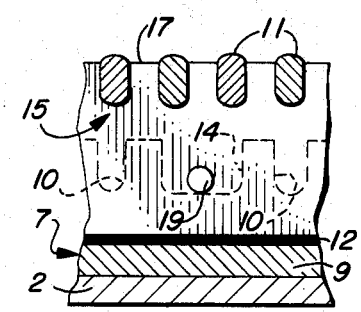
FIG. 12 is a sectional view, taken along the line 12—12 in FIG. 9, of the channel of grid extensions illustrated in FIG. 9.

In operation, and referring again to FIGS. 1–12 of the drawings, when the channel grids 7 are used on the deck 2 of the filter drum 1, multiple inside grid extensions 15 and outside grid extensions 16, having the relative desparate widths illustrated in FIGS. 7, 8 and 9 are used to extend the height of the channel grid legs 8 in the channel grids 7. Specifically, the inside grid extensions 15 are shorter than the outside grid extensions 16 by the width of the channel grid base 9 of each of the channel grids 7, in order to insure that the top edges 17 of both the inside grid extensions 15 and the outside grid extensions 16 are coextensive from the deck 2. The round pins 19 are inserted in spaced relationship in the inside grid extensions 15 and the outside grid extensions 16 at equal distances from the top edges 17 of the inside grid extensions 15 and the outside grid extensions 16. The theoretical centerline of the filter drum 1 is then determined by rotating the filter drum 1 on a cooperating trunnion (not illustrated) and machining a pin slot 14 in the top edges of each of the channel grid legs 8 to a desired depth. Additional pin slots 14 are then cut in spaced relationship in the channel grid legs 8 to this uniform depth. The length of the projecting portion of the pins 19 are chosen such that they do not extend completely through the pin slots 14, in order to provide a space between the projecting ends of the pins 19 and the unoccupied portion of the pin slots 14, with which to apply the welds 12, as illustrated in FIGS. 7–9. Additional welds 12 are applied at the bottom edges 18 of both the inside grid extensions 15 and the outside grid extensions 16, to mount the inside grid extensions 15 to the channel grid base 9 of each of the channel grids 7 and the outside grid extensions 16 to the deck 2, as illustrated. Since the pin slots 14 have been machined to a uniform depth which is equal to a selected radius extending from the theoretical centerline 13 of the filter drum 1 and each of the pins 19 is seated securely in the pin slots 14, it follows that the top edges 17 of both the inside grid extensions 15 and the outside grid extensions 16 are also located at a second common radius also extending from the theoretical centerline 13 of the filter drum 1. Accordingly, when the backing wire 11 is located in the additional grooves 10 provided in the top edges 17 of the inside grid extensions 15 and the outside grid extensions 16, this backing wire 11 is also situated at or near the second selected uniform radius measured from the theoretical centerline 13. Accordingly, a screen (not illustrated) which is placed over the backing wire 11 and used as the filtering surface for the filter drum 1 is located at a uniform working or filtering radius with respect to the theoretical centerline 13 and facilitates removal of a cake of paper slurry of uniform thickness from the screen during operation of the filter drum 1.

Referring now to FIGS. 13–16 of the drawings, when it is desired to use the anti-rewetting grid extensions 20 and/or the angle grid extensions 24 as an anti-rewetting feature in the filter drum 1, the anti-rewetting grid extensions 20, each having a support leg 23, an extension leg 21 and a bottom leg 22 of appropriate size, and the angle grid extensions 24, having only an extension leg 21 and a bottom leg 22, are fabricated and the bottom legs 22 of both extension grid designs are provided with multiple pins 19 in the same manner as the inside grid extensions 15 and the outside grid extensions 16 described above. The single-leg grids 6 or channel grid legs 8, depending upon whether the filter drum 1 is fitted with single leg grids 6 or channel grids 7, are then provided with spaced pin slots 14 by the machining technique outlined above, wherein the pin slots 14 are cut to a selected depth which corresponds to a first uniform, selected radius with respect to the theoretical centerline 13 of the filter drum 1. The anti-rewetting grid extensions 20 and/or angle grid extensions 24 are then seated adjacent the single-leg grids 6 or the channel grid legs 8, as the case may be, with the pins 19 inserted in the pin slots 14, as illustrated in FIGS. 13, 15 and 16. Welds 12 are then applied to the ends of the pins 19 to secure the pins 19 in the pin slots 14 in the same manner as described above with respect to the inside grid extensions 15 and the outside grid extensions 16. Since each of the extending legs 21 of the anti-rewetting grid extensions 20 and the angle grid extensions 24 is located beneath the grooves 10 in the support legs 23, or below the extending ends of the single leg grid 6 or channel grid legs 8, respectively, ample room is provided for the backing wire 11 to fit in the grooves 10 and locate the backing wire 11 at a second uniform radius with respect to the theoretical centerline 13 of the filter drum 1. Conventional wire screen (not illustrated) is then placed over the backing wire 11 as described above and the filtering surface of the filter drum 1 is oriented in a constant selected radius with respect to the theoretical centerline 13.

It will be appreciated by those skilled in the art that the inside grid extensions 15 and the outside grid extensions 16 can be mounted on the single-leg grids 6 as well as on the channel grids 7. Accordingly, it is understood that either the inside grid extensions 15 or the outside grid extensions 16 can be provided with pins 19 and seated in pin slots 14 as illustrated in FIGS. 13, 15 and 16, with respect to the anti-rewetting grid extensions 20 and angle grid extensions 24. Similarly, the anti-rewetting grid extensions 20 and the angle grid extensions 24 can be equally well mounted to the channel grids 7 with modifications identical to those provided in the inside grid extensions 15 and outside grid extensions 16, to accommodate the thickness of the channel grid base 9, as illustrated in FIG. 16. Furthermore, it is understood that under circumstances where the filter drum is nonuniform in diameter, both the inside grid extensions 15 and the outside grid extensions 16, as well as the anti-rewetting grid extensions 20 and the angle grid extensions 24 can be tapered and shaped to accommodate the shape of the filter drum 1 and the deck 2, as deemed necessary. Under these circumstances, it is only necessary that the pin slots 14 be cut into either the single-leg grids 6 or the channel grid legs 8 of the channel grids 7 a distance which is equal to a common or uniform radius extending from the theoretical centerline 13 of the filter drum 1. Furthermore, under these circumstances, the pins 19 must be provided in the inside grid extensions 15, outside grid extensions 16 and the bottom legs 22 of the anti-rewetting grid extensions 20 and the angle grid extensions 24, at a uniform distance from the top edges thereof, in order to insure that the top edges of these members also extend to a desired common radius from the theoretical centerline 13.

Other modifications of the rotary drum filter grid extension and method of this invention will be apparent to those skilled in the art and while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In a rotary filter having an outer cylindrical desk and a plurality of support members extending in spaced, longitudinally radial relationship from the deck for supporting backing wire, the improvement in combination therewith comprising means for providing optimum rotation of the rotary filter, including a filter grid extension characterized by at least two slots provided in spaced relationship in each of the support members, said slots extending to a common radial depth with respect to the center line of the deck; grid extension means lapped against each of the support members and adapted to radially extend beyond the extending edges of said support members; at least two pins projecting through each of said grid extension means in spaced relationship with respect to each other and in substantially perpendicular relationship with respect to said grid extension means, said pins provided in registration with said slots, respectively; and backing wire grooves provided in said grid extension means for receiving the backing wire.

2. The filter grid extension of claim 1 wherein said grid extension means further comprises an elongated plate having a length substantially equal to the length of the support members and a width which exceeds the width of the support members.

3. The filter grid extension of claim 1 wherein the support members are generally U-shaped and are each characterized by a base member provided with spaced, upward-standing leg members and one of said grid extension means is secured to each of the leg members.

4. The filter grid extension of claim 3 wherein first alternating ones of said grid extension means in sequence are secured to the outside of one of each of the leg members.

5. The filter grid extension of claim 3 wherein second alternating ones of said grid extension means in sequence are secured to the inside of one of each of the leg members and rest against the base member of each of the support members.

6. The filter grid extension of claim 3 wherein:
(a) first alternating ones of said grid extension means in sequence are secured to the outside of one of each of the leg members; and
(b) second alternating ones of said grid extension means in sequence are secured to the inside of one of each of the leg members and rest against the base member of each of the support members.

7. The filter grid extension of claim 3 wherein said grid extension means further comprises an elongated plate having a length substantially equal to the length of the support members and a width which exceeds the width of the support members.

8. The filter grid extension of claim 1 wherein:
(a) said grid extension means further comprises an elongated plate having a length substantially equal to the length of the support members and a width which exceeds the width of the support members; and
(b) the support members are generally U-shaped and are each characterized by a base member provided with spaced, upward-standing leg members and one of said grip extension means is secured to each of the leg members.

9. The filter grid extension of claim 1 wherein said pins are shorter than the thickness of said grooves and said pins are welded to the leg members in said grooves.

10. The filter grid extension of claim 1 wherein:
(a) said grid extension means further comprises an elongated plate having a length substantially equal to the length of the support members and a width which exceeds the width of the support members;
(b) the support members are generally U-shaped and are each characterized by a base member provided with spaced, upward-standing leg members and one of said grid extension means is secured to each of the leg members; and (c) said pins are shorter than the thickness of said grooves and said pins are welded to the leg members in said grooves.

11. The filter grid extension of claim 10 wherein:
(a) first alternating ones of said grid extension means in sequence are secured to the outside of one of each of the leg members; and
(b) second alternating ones of said grid extension means in sequence are secured to the inside of one of each of the leg members and rest against the base member of each of the support members.

12. The filter grid extension of claim 1 wherein said grid extension means is further characterized by a bottom leg, an extending leg projecting outwardly from said bottom leg in substantially perpendicular relationship with respect to said bottom leg and a support leg extending said bottom leg beyond the point of connection between said bottom leg and said extending leg, with said pins projecting from said bottom leg and said backing wire grooves provided in said support leg.

13. The filter grid extension of claim 12 wherein the support members are generally U-shaped and are each characterized by a base member provided with spaced, upward-standing leg members and one of said bottom leg is secured to each of the leg members.

14. The filter grid extension of claim 13 wherein first alternating ones of said bottom leg in sequence are secured to the outside of a first one of the leg members in each of the U-shaped support members.

15. The filter grid extension of claim 13 wherein second alternating ones of said bottom leg is sequence are secured to the inside of a second one of the leg members in each of the U-shaped support members and rest against the base member of each of the support member.

16. The filter grid extension of claim 13 wherein:
(a) first alternating ones of said bottom leg in sequence are secured to the outside of a first one of the leg members in each of the U-shaped support member; and
(b) second alternating ones of said bottom leg in sequence are secured to the inside of a second one of the leg members in each of the U-shaped support members and rest against the base member of each of the support members.

17. The filter grid extension of claim 12 wherein said pins are shorter than the thickness of said grooves and said pins are welded to the leg members in said grooves.

18. The filter grid extension of claim 12 wherein:
(a) the support members are generally U-shaped and are each characterized by a base member provided with spaced, upward-standing leg members and one of said bottom leg is secured to each of the leg members;
(b) first alternating ones of said bottom leg in sequence are secured to the outside of a first one of the leg members in each of the U-shaped support members;
(c) second alternatine one of said bottom leg in sequence are secured to the inside of a second one of the leg members in each of the U-shaped support members and rest against the base member of each of the support members; and
(d) said pins are shorter than the thickness of said grooves and said pins are welded to the leg members in said grooves.

19. In a rotary filter having an outer cylindrical deck and a plurality of support members extending in spaced, longitudinally radial relationship from the deck for supporting backing wire, the improvement in combination therewith comprising means for providing optimum uniform rotation of the rotary filter on its longitudinal axis, including a filter grid extension characterized by at least two slots provided in spaced relationship in each of the support members, said slots extending to a common radial depth with respect to the center line of the deck; grid extension means radially extended alongside the support members and adapted to terminate below the extending edges of said support members; and at least two pins projecting through each of said grid extension means in substantially perpendicular relationship with respect to said grid extension means, said pins provided in registration with said slots, respectively.

20. The filter grid extension of claim 19 wherein said grid extension means further comprises an elongated bottom leg plate having a length substantially equal to the length of the support members, an extending leg projecting outwardly from said bottom leg plate in substantially perpendicular relationship with respect to said bottom leg plate, and a support leg extending said bottom leg from the junction of said bottom leg and said extending leg, with said pins projecting from said bottom leg plate.

21. The filter grid extension of claim 19 wherein the support members are generally U-shaped and are each characterized by a base member provided with spaced, upward-standing leg members and one of said bottom leg plate is secured to each of the leg members.

22. The filter grid extension of claim 21 wherein first alternating ones of said bottom leg plate in sequence are secured to the outside of a first one of the leg members in each of the U-shaped support members.

23. The filter grid extension of claim 21 wherein second alternating ones of said bottom leg plate in sequence are secured to the inside of a second one of the leg members in each of the U-shaped support members and rest against the base member of each of the support members.

24. The filter grid extension of claim 21 wherein:
(a) first alternating ones of said bottom leg plate in sequence are secured to the outside of a first one of the leg members in each of the U-shaped support members; and
(b) second alternating ones of said bottom leg plate in sequence are secured to the inside of a second one of the leg members in each of the U-shaped support members and rest against the base member of each of the support members.

25. The filter grid extension of claim 21 wherein said grid extension means further comprises an elongated bottom leg plate having a length substantially equal to the length of the support members, an extending leg projecting outwardly from said bottom leg plate in substantially perpendicular relationship with respect to said bottom leg plate, and a support leg extending said bottom leg from the junction of said bottom leg and said extending leg, with said pins projecting from said bottom leg plate.

26. The filter grid extension of claim 19 wherein:
(a) said grid extension means further comprises an elongated bottom leg plate having a length substantially equal to the length of the support members and an extending leg projecting outwardly from said bottom leg plate in substantially perpendicular relationship with respect to said bottom leg plate, with said pins projecting from said bottom leg plate; and (b) the support members are generally U-shaped and are each characterized by a base member provided with spaced, upward-standing leg members and one of said bottom leg plate is secured to each of the leg members.

27. The filter grid extension of claim 19 wherein said pins are shorter than the thickness of said grooves and said pins are welded to the leg members in said grooves.

28. The filter grid extension of claim 19 wherein:
(a) said grid extension means further comprises an elongated bottom leg plate having a length substantially equal to the length of the support members and an extending leg projecting outwardly from said bottom leg plate in substantially perpendicular relationship with respect to said bottom leg plate, with said pins projecting from said bottom leg plate;
(b) the support members are generally U-shaped and are each characterized by a base member provided with spaced, upward-standing leg members and one of said bottom leg plate is secured to each of the leg members; and
(c) said pins are shorter than the thickness of said grooves and said pins are welded to the leg members in said grooves.

29. The filter grid extension of claim 28 wherein:
(a) first alternating ones of said bottom leg plate in sequence are secured to the outside of a first one of the leg members in each of the U-shaped support members; and
(b) second alternating ones of said bottom leg plate in sequence are secured to the inside of a second one of the leg members in each of the U-shaped support members and rest against the base member of each of the support members.

30. A method for constructing a filtering surface having a substantially uniform working radius with respect to the centerline of a rotary drum filter provided with a cylindrical deck and radially oriented support members carried by the deck, which method comprises optimizing rotation of the rotary drum filter by the steps of:
(a) cutting at least two slots in each of the support members, said slots terminating in the support members at a first uniform radius measured from the centerline of the drum;
(b) providing grid extension members having grooves in the top edge thereof and a length substantially equal to the support members, said grid extension members also having a width wider than the support members, with at least two pins extending from said grid extension members in spaced relationship with respect to each other and substantially perpendicular to said grid extension members; and
(c) mounting said pins in said slots provided in the support members, whereby said grid extension members are secured on the support members to locate said grooves in said grid extension members at said uniform working radius.

31. The method according to claim 30 further comprising the step of adding an extending leg to each of said grid extension members wherein said extending leg projects outwardly from said grid extension members is substantially perpendicular relationship below the top edge of said grid extension members.

32. The method according to claim 30 further comprising the step of welding said pins in said slots.

33. The method according to claim 30 further comprising the steps of:
(a) adding an extending leg to each of said grid extension members wherein said extending leg projects outwardly from said grid extension members in substantially perpendicular relationship below the top edge of said grid extension members; and
(b) welding said pins in said slots.

* * * * *